United States Patent Office 3,544,616
Patented Dec. 1, 1970

3,544,616
AMMOXIDATION OF PROPYLENE OR ISO-BUTYLENE TO ACRYLONITRILE OR METHACRYLONITRILE
Robert K. Grasselli, Warrensville Heights, and Maria S. Friederich, Cleveland, Ohio, assignors to The Standard Oil Company, Cleveland, Ohio, a corporation of Ohio
No Drawing. Filed Dec. 20, 1967, Ser. No. 691,992
Int. Cl. C07c *121/02*
U.S. Cl. 260—465.3
2 Claims

ABSTRACT OF THE DISCLOSURE

Catalysts are provided which are useful in the oxidation of olefins to aldehydes and conjugated dienes and in ammoxidation of olefins to nitriles. The catalysts comprise the combined oxides of uranium and arsenic on a catalyst support and the combined oxides of uranium and arsenic promoted by molybdenum, boron, vanadium, tin, nickel, bismuth, chromium, iron, manganese, zinc, tungsten, antimony, cerium, cobalt or rhenium.

BACKGROUND OF THE INVENTION

This invention relates to oxidation catalysts comprising oxides of uranium and arsenic optionally incorporating promoters, which are useful for the catalytic oxidation of olefins to aldehydes and conjugated dienes, and for the catalytic ammoxidation of olefins to nitriles. The catalytic oxidation reactions are exemplified by the oxidation of propylene to acrolein, the oxidation of isobutylene to methacrolein, the oxydehydrogenation of an olefin having 4 to 8 carbons, such as the oxydehydrogenation of butene-1 or butene-2 to butadiene-1,3, the ammoxidation of propylene to acryonitrile and the ammoxidation of isobutylene to methacrylonitrile.

The prior art is replete with a multiplicity of oxidation catalysts particularly suited to the same reactions disclosed herein. Some of these oxidation catalysts are disclosed in U.S. Pats 2,904,580; 3,142,697; 3,179,694; 3,197,419; 3,198,750; 3,200,081; 3,200,084; 3,226,421; 3,248,340; 3,264,225; 3,251,900; 3,257,474; 3,260,768; French Pats. 1,255,121; 2,269,382; and British Pats. 864,666; 876,446; 983,755. It is well known that some catalysts are more successful than others and that the search for economically competitive catalysts continues unremittingly. The oxidation catalyst of the instant invention is a superior catalyst.

DESCRIPTION OF THE PREFERRED EMBODIMENT OF THE INVENTION

The uranium-oxide arsenic-oxide base catalyst disclosed herein is referred to as a mixture of uranium and arsenic oxides, but this is not to be construed as meaning that the catalyst is composed either in whole or in part of only these compounds. The proportions of arsenic and uranium in the catalyst system may vary widely. The preferred uranium:arsenic atomic ratio ranges from about 6:1 to about 1:6; optimum activity appears to be obtained at uranium:arsenic atomic ratios within the range of from about 1:1 to about 1:4 and the catalyst is characterized by a negligible loss of arsenic despite the relatively high reaction temperatures of the catalytic processes in which it is useful.

The catalyst of the instant invention contains from 5 percent to 95 percent by weight of a catalyst support, and preferably between 10 percent and 90 percent. Any known catalyst support such as alumina, pumice, silicon carbide, titania, zirconia, alumina-silica, and the inorganic phosphates, silicates, aluminates, borates and carbonates stable under the reaction conditions, may be used but silica is preferred.

In the preparation of the base catalyst useful in this invention, the arsenic oxide and uranium oxide can be blended together or can be formed separately and then blended or formed separately, or together in situ.

The uranium oxide component of the instant catalyst can be useful in the form of uranous, uranic or combined uranous-uranic oxides, or by precipitation in situ from a soluble uranyl salt, such as the nitrate, acetate or a halide such as the chloride. Uranium metal can be used as a starting material, and if free arsenic is also employed, the arsenic can be converted to the oxide and the uranium to the nitrate simultaneously by oxidation in hot nitric acid. A slurry of hydrous arsenic-arsenic oxide in nitric acid can be combined with a solution of a uranium salt which is then precipitated in situ as the hydroxide by making the solution alkaline with ammonium hydroxide, the ammonium nitrate and the other ammonium salts being removed by filtration of the resulting slurry or by thermal decomposition.

It will be apparent from the above that uranous and uranic bromides, chlorides, fluorides and iodides, nitrates, acetates, sulfites, sulfates, phosphates, thiocyanates, thiosulfates, oxalates, formates and hydroxides can be employed as the source of the uranium oxide components. A preferred source is uranyl nitrate.

As starting materials for the arsenic oxide component there can be used any arsenic oxide such as arsenic trioxide or arsenic pentoxide; or a hydrolyzable or decomposable arsenic salt such as an arsenic halide. Arsenic metal can be employed, the oxide being formed by oxidizing the metal with an oxidizing acid, such as nitric acid. A preferred starting material is ortho-arsenic acid.

The catalytic activity of the novel catalyst embodied in the present invention, is enhanced by heating the catalyst at an elevated temperature. Preferably, the catalyst mixture is dried and heated at a temperature of from 500 to 1500° F., more preferably at about 700 to 900° F. for from 2 to 24 hours. If activity then is insufficient, the catalyst can be further heated at a temperature above about 1000° F. but below a temperature deleterious to the catalyst at which it is melted or decomposed, preferably from about 1100° F. to about 1800° F. for from 1 to 48 hours, in the presence of oxygen or an oxygen-containing gas such as air.

In general the higher the activation temperature, the less time required to effect activation. The sufficiency of activation at any given set of conditions is ascertained by a spot test of a sample of the material for catalytic activity. Activation is best carried out in an open chamber, permitting circulation of air or oxygen, so that any oxygen consumed will be replaced.

The instant catalyst comprising the combined oxides of uranium and arsenic may be defined by the following empirical formula $U_xAs_yO_z$ where the As:U atomic ratio is in the range from about 1:25 to about 10.1 and $z$ is determined by the oxidation state of U and As in the catalyst. It is conjectured that the combined oxides of the instant catalyst are present as an activated catalytic oxide complex.

Various metal oxides have been found to act as promoters in conjunction with the uranium-arsenic base catalyst, as for example, minor amounts of an element or elements selected from Groups I–A, I–B, II–A, II–B, III–B, IV–A, IV–B, V–B, VI–B, VII–B, and VIII of the Periodic Table. Particularly effective promoters are the oxides of molybdenum, boron, vanadium, tin, nickel, bismuth, chromium, iron, manganese, zinc, and tungsten in an amount corresponding to less than one atomic equivalent per atomic equivalent of either uranium or arsenic.

Promoter oxides may be incorporated into the base catalyst by blending into the gel before calcining, or by blending into the oven-dried base catalyst before calcining.

A preferred manner of incorporating promoter elements is by choosing a water-soluble salt of the promoter element, forming an aqueous solution of the salt, and mixing this solution with uranyl nitrate and ortho-arsenic acid solutions, and stirring while continuously heating till the solution gels. The gel is then spooned into trays and oven-dried at 120° C. overnight. The dried catalyst is then calcined starting at 800° F., the temperature raised to 900° F. over a period of 2 hours and the catalyst calcined overnight at this temperature. A further calcination at a higher temperature of at least 1000° F. for 3 hours is generally employed to increase the activity of the catalyst complex. This catalyst system is useful in the oxidation of olefins to oxygenated compounds, such as aldehydes and acids, in the presence of oxygen; in the oxidation of olefins to unsaturated nitriles in the presence of oxygen and ammonia; and in the oxydehydrogenation of olefins to diolefins and aromatic compounds. Nitriles and oxygenated compounds such as aldehydes and acids can be produced simultaneously using process conditions within the overlapping ranges for these reactions as set forth in detail below. The relative proportions of each that are obtainable will depend on the process conditions, the particular catalyst and on the olefin. The same catalyst may produce predominantly the nitrile with propylene and predominantly the aldehyde and/or acid with isobutylene. The term "oxidation" as used in this specification and claims encompasses the oxidation to aldehydes and acids and to nitriles and dienes all of which oxidation reactions require as a reactant.

Oxidation of olefins to aldehydes and acids

The reactants used in the oxidation to oxygenated compounds are oxygen and an olefin having only three carbon atoms in a straight chain such as propylene or isobutylene or mixtures thereof.

The olefins may be in admixture with paraffinic hydrocarbons, such as ethane, propane, butane, and pentane; for example, a propylene-propane mixture may constitute the feed. This makes it possible to use ordinary refinery streams without special preparation.

The temperature at which this oxidation is conducted may vary considerably depending upon the catalyst, the particular olefin being oxidized and the correlated conditions of the rate of throughput or contact time and the ratio of olefin to oxygen. In general, when operating at pressures near atmospheric, i.e., −10 to 100 p.s.i.g., temperatures in the range of 500 to 1100° F. may be advantageously employed. However, the process may be conducted at other pressures, and in the case where super-atmospheric pressures, e.g., above 100 p.s.i.g., are employed, somewhat lower temperatures are possible. In the case where this process is employed to convert propylene to acrolein, a temperature range of 750 to 950° F. has been found to be optimum at atmospheric pressure.

While pressures other than atmospheric may be employed, it is generally preferred to operate at or near atmospheric pressure, since the reaction proceeds well at such pressures and the use of expensive high pressure equipment is avoided.

The apparent contact time employed in the process is not critical and it may be selected from a broad operable range which may vary from 0.1 to 50 seconds. The apparent contact time may be defined as the length of time in seconds which the unit volume of gas measured under the conditions of reaction is in contact with the apparent unit volume of the catalyst. It may be calculated, for example, from the apparent volume of the catalyst bed, the average temperature and pressure of the reactor, and the flow rates of the several components of the reaction mixture.

The optimum contact time will, of course, vary depending upon the olefin being treated, but in the case of propylene and isobutylene, the preferred apparent contact time is 0.15 to 15 seconds.

A molar ratio of oxygen to olefin between about 0.5:1 to 5:1 generally gives the most satisfactory results. For the conversion of propylene to acrolein, a preferred ratio of oxygen to olefin is from about 1:1 to about 2:1. The oxygen used in the process may be derived from any source; however, air is the least expensive source of oxygen and is preferred for that reason.

Water is formed as a product of reaction and it has been found that it has a beneficial influence on the source of the reaction in that it improves the conversion and the yields of the desired product. Sometimes it is desirable to add some water to the reaction mixture. The manner in which water affects the reaction is not fully understood but the theory of this phenomenon is not deemed important in view of the experimental results we have obtained.

Inert diluents, such as nitrogen and carbon dioxide, may be present in the reaction mixture.

Oxidation of olefins to nitriles

The reactants are the same as those used in the oxidation of olefins to aldehydes described above except that ammonia is included as a reactant. Any of the olefins described above can be used.

In its preferred aspect, the process comprises contacting a mixture comprising propylene or isobutylene, ammonia and oxygen with either the promoted or unpromoted catalyst of this invention at an elevated temperature and at atmospheric or near atmospheric pressure.

Any source of oxygen may be employed in this process. For economic reasons, however, it is preferred that air be employed as the source of oxygen. From a purely technical viewpoint, relatively pure molecular oxygen will give equivalent results. The molar ratio of oxygen to the olefin in the feed to the reaction vessel should be in the range of 0.5:1 to 4:1 and a ratio of about 1:1 to 3:1 is preferred.

Low molecular weight saturated hydrocarbons do not appear to influence the reaction to an appreciable degree, and these materials can be present; consequently the addition of saturated hydrocarbons to the feed to the reaction is contemplated within the scope of this invention. Likewise, diluents, such as nitrogen and the oxides of carbon, may be present in the reaction mixture without deleterious effect.

The molar ratio of ammonia to olefin in the feed to the reactor may vary between about 0.05:1 to 5:1. There is no real upper limit for the ammonia-olefin ratio, but there is generally no reason to exceed the 5:1 ratio. At ammonia:olefin ratios appreciably less than the stoichiometric ratio of 1:1, various amounts of oxygenated derivatives of the olefin will be formed.

Significant amounts of unsaturated aldehydes, as well as nitriles, will be obtained at ammonia-olefin ratios substantially below 1:1, i.e., in the range of 0.15:1 to 0.75:1. Outside the upper limit of this range only insignificant amounts of aldehydes will be produced, and only very small amounts of nitriles will be produced at ammonia-olefin ratios below the lower limit of this range. It is fortuitous that within the ammonia-olefin range stated, maximum utilization of ammonia is obtained and this is highly desirable. It is generally possible to recycle any unreacted olefin and unconverted ammonia.

A particularly surprising aspect of this invention is the effect of water on the course of the reaction. We have found that in many cases water in the mixture fed to the reaction vessel improves the selectivity of the reaction and the yield of nitrile. However, reactions not including water in the feed are not to be excluded from this invention inasmuch as water is formed in the course of the reaction.

In general, the molar ratio of added water to olefin, when water is added, is at least about 0.25:1. Ratios on the order of 1:1 to 3:1 are particularly desirable, but higher ratios may be employed, i.e., up to about 10:1.

The reaction is carried out at a temperature within the range of from about 550 to 1100° F. The preferred temperature range is from about 800 to 1000° F.

The pressure at which the reaction is conducted is also an important variable, and the reaction should be carried out at about atmospheric or slightly above atmospheric (2 to 3 atmospheres) pressure. In general, high pressures, i.e., about 250 p.s.i.g., are not suitable, since higher pressures tend to favor the formation of undesirable by-products.

The apparent contact time is not critical, and contact times in the range of from 0.1 to about 50 seconds may be employed. The optimum contact time will, of course, vary depending upon the olefin being treated, but in general, a contact time of from 1 to 15 seconds is preferred.

The oxidative dehydrogenation of olefins to diolefins and aromatics

In accordance with the present invention, the promoted or unpromoted catalyst system is employed in the catalytic oxidative dehydrogenation of olefins to diolefins and aromatic compounds. In the process, the feed stream in vapor form containing the olefin to be dehydrogenated and oxygen is conducted over the promoted catalyst at a comparatively low temperature to obtain the corresponding diolefin or aromatic compound.

By the term "olefin" as used herein is meant the open chain as well as cyclic olefins. The olefins dehydrogenated in accordance with this invention have at least four and up to about eight nonquaternary carbon atoms, of which at least four are arranged in series in a straight chain or ring. The olefins preferably are either normal straight chain or tertiary olefins. Both cis and trans isomers, where they exist, can be dehydrogenated.

Among the many olefinic compounds which can be dehydrogenated in this way are butene-1; butene-2; pentene-1; pentene-2; heptene-1; octene-1; tertiary pentenes and hexenes having one tertiary carbon atom such as 2-methyl-pentene-1, 3 - methylbutene-1, 3,4 - dimethyl-pentene-1, 4-methyl-pentene-2; other branched chain olefins such as 2-methyl-butene-2, 2-methyl-butene-1, 3-methyl-pentene-2; cyclo-olefins such as cyclopentene; cyclohexene; 3-methyl cyclohexene and cycloheptene.

Open chain olefins yield diolefins, and, in general, six-membered ring olefins yield aromatic ring compounds. The higher molecular weight open chain olefins may cyclize to aromatic ring compounds.

The feed stock in addition to the olefin and oxygen can contain one or more paraffinic or napthenic hydrocarbons having up to about 10 carbons atoms, which may be present as impurities in some petroleum hydrocarbon stocks and which may also be dehydrogenated in some cases. In this oxidative dehydrogenation reaction, propylene and isobutylene should not be included in the feed in substantial amounts.

The amount of oxygen should be within the range of from about 0.3 to about 3 moles per mole of olefin. Stoichiometrically, 0.5 to 1.5 moles of oxygen per mole of olefin is required for the dehydrogenation to diolefins and aromatics respectively. It is preferred to employ an excess of oxygen, from 1 to about 2 moles per mole of olefin, in order to ensure a higher yield of diolefin per pass. The oxygen can be supplied as pure or substantially pure oxygen or as air or in the form of hydrogen peroxide.

When pure oxygen is used, it may be desirable to incorporate a diluent in the mixture such as steam, carbon dioxide or nitrogen.

The feed stock is preferably catalytically dehydrogenated in the presence of steam, but this is not essential. Usually, from about 0.1 to about 6 moles of steam per mole of olefin reactant is employed, but amounts larger than this can be used.

The dehydrogenation proceeds at temperatures within the range of from about 325° C. to about 1000° C. Optimum yields are obtainable at temperatures within the range from about 400 to 550° C. However, since the reaction is exothermic, temperatures in excess of 550° C. should not be used, unless means are provided to carry off the heat liberated in the course of the reaction. Due to the exothermic nature of the reaction, the temperature of the gaseous reaction mixture will be higher than the temperature of the feed entering the system by as much as 75° C. The temperatures referred to are those of the entering gas feed near the reactor inlet.

The preferred reaction pressure is approximately atmospheric, within the range of from about 5 to about 75 p.s.i.g. Higher pressures up to about 300 p.s.i.g. can be used and have the advantage of simplifying the product recovery.

Only a brief contact time with the catalyst is required for effective dehydrogenation. The apparent contact time with the catalyst can vary from about 0.5 up to about 50 seconds but higher contact times can be used if desired. At these contact times, comparatively small reactors and small amounts of catalyst can be used effectively.

In general, any apparatus of the type suitable for carrying out oxidation reactions in the vapor phase may be employed in the execution of these processes. The processes may be conducted either continuously or intermittently. The catalyst bed may be a fixed bed employing a large particulate or pelleted catalyst or, in the alternative, a so-called "fluidized" bed of catalyst may be employed.

The reactor may be brought to the reaction temperature before or after the introduction of the reaction feed mixture. However, in a large-scale operation, it is preferred to carry out the process in a continuous manner, and in such a system, the recirculation of the unreacted olefin is contemplated.

The catalyst compositions and oxidation process of this invention are further illustrated in the following examples wherein the amounts of the various ingredients are expressed as parts by weight unless otherwise specified.

Examples 1–16

(1) In a typical preparation of the unpromoted catalyst, 87.8 g. of uranyl nitrate $(UO_2)(NO_3)_2 \cdot 6H_2O$ were dissolved in about 100 cc. of hot water; 154.3 g. of ortho-arsenic acid $H_3AsO_4 \cdot \frac{1}{2}H_2O$ were dissolved in about 400 cc. of hot water. The uranyl nitrate solution was added to the dilute ortho-arsenic acid and the mixture stirred. To this mixture was added 116.8 of Ludox® AS, a commercially available dispersion of 30% by weight of silica, $SiO_2$. The mixture was continuously heated with constant stirring until it gelled. The gel was spooned into trays, placed in an atmospheric convection oven at 120° C. and dried overnight. The oven-dried catalyst was then heat-treated in a furnace open to the atmosphere, starting at 800° F. and being raised to 900° F. over a period of about two hours. The catalyst was calcined overnight at 900° F. The catalyst obtained had a composition which may be written as 82.5% $UAs_{5.8}O_{17.5}$-17.5% $SiO_2$.

(2) A portion of the above-described catalyst (calcined at 900° F.) was further calcined at 1200° F. for 3.5 hours.

(3) A portion of the above-described catalyst (calcined at 900° F.) was further calcined at 1375° F. for 3 hours.

(4) In another preparation of the unpromoted catalyst, 215 g. of uranyl nitrate were dissolved in about 200 cc. of hot water; 64.6 of ortho-arsenic acid $H_3AsO_4 \cdot \frac{1}{2}H_2O$ were dissolved in about 100 cc. of hot water. The uranyl nitrate solution was added to the dilute ortho-arsenic acid and the mixture stirred. To this mixture was added 116.8 g. of Ludox® AS a commercially available dispersion of 30% by weight of silica, $SiO_2$. The mixture was continuously heated with constant stirring until it gelled. The gel was spooned into trays, placed in an atmospheric convection oven at 120° C. and dried overnight. The oven-dried catalyst was then heat-treated in a furnace open to the atmosphere, starting at 800° F. and being raised to 900°

F. over a period of about two hours. The catalyst was calcined overnight at 900° F. The catalyst obtained had a composition which may be written as 82.5% $UAsO_{5.5}$-17.5% $SiO_2$.

(5) A portion of the above-described catalyst (calcined at 900° F.) was further calcined at 1200° F. for 3.5 hours.

(6) A portion of the above described catalyst (calcined at 900° F.) was further calcined at 1500° F. for 3 hours.

(7) A portion of the above-described catalyst (calcined at 900° F.) was further calcined at 1700° F. for 3 hours.

(8) In another preparation of the unpromoted catalyst 239 g. of uranyl nitrate $(UO_2)(NO_3)_2 \cdot 6H_2O$ were dissolved in about 200 cc. of hot water; 48.1 g. of ortho-arsenic acid $H_3AsO_4 \cdot \frac{1}{2}H_2O$ were dissolved in about 100 cc. of hot water. The uranyl nitrate solution was added to the dilute ortho-arsenic acid and the mixture stirred. To this mixture was added 116.8 g. of Ludox® AS, a commercially available dispersion of 30% by weight of silica, $SiO_2$. The mixture was continuously heated with constant stirring until it gelled. The gel was spooned into trays, placed in an atmospheric convection oven at 120° C. and dried overnight. The oven-dried catalyst was then heat-treated in a furnace open to the atmosphere, starting at 800° F. and being raised to 900° F. over a period of about two hours. The catalyst was calcined overnight at 900° F. The catalyst obtained had a composition which may be written as 82.5% $UAs_{0.7}O_{4.77}$-17.5% $SiO_2$.

(9) A portion of the above-described catalyst (calcined at 900° F.) was further calcined at 1200° F. for 3.25 hours.

(10) A portion of the above-described catalyst (calcined at 900° F.) was further calcined at 1500° F. for 3.5 hours.

(11) A portion of the above-described catalyst (calcined at 900° F.) was further calcined at 1750° F. for 3 hours.

Other catalyst compositions were prepared in a manner similar to that described hereinabove, so as to vary the ratio of arsenic to uranium. Ratios as low as 0.1 gave good conversions, though the better conversions were obtained with ratios in excess of 2.

The following Table I shows runs for the conversion of propylene to acrylonitrile, made with each of the above-described unpromoted catalysts, all the runs having been made under substantially similar process conditions, namely a weight hourly space velocity (WWH) in the range from about 0.04 to about 0.1 hr.$^{-1}$ a reactor temperature in the range from about 850° F. to about 950° F. and a slight excess of ammonia over the theoretical amount, at substantially atmospheric pressure, Percent conversion to acrylonitrile $$= \frac{\text{Moles acrylonitrile recovered}}{\text{Moles propylene fed}} \times 100$$

TABLE I.—UNPROMOTED CATALYST

| Ex. No. | Atomic ratio arsenic: uranium | Calcined overnight at 900° F. and additionally for— | Percent per pass conversion of propylene to acrylonitrile |
|---|---|---|---|
| 1 | 5.8 | | 39.6—G |
| 2 | 5.8 | 3.5 hrs. at 1,200° F | 59.4 |
| 3 | 5.8 | 3 hrs. at 1,375° F | 57.3 |
| 4 | 1 | | 35.8 |
| 5 | 1 | 3.5 hrs. at 1,200° F | 45.7 |
| 6 | 1 | 3 hrs. at 1,500° F | 24.9 |
| 7 | 1 | 3 hrs. at 1,700° F | 18.1 |
| 8 | 0.7 | | 6.2 |
| 9 | 0.7 | 3.25 hrs. at 1,200° F | 28.4 |
| 10 | 0.7 | 3.5 hrs. at 1,500° F | 23.1 |
| 11 | 0.7 | 3 hrs. at 1,700° F | 11.5 |
| 12 | 0.2 | | 19.3—G |
| 13 | 2 | | 47.6 |
| 14 | 3 | 3 hrs. at 1,000° F | 57.2 |
| 15 | 3 | 3 hrs. at 1,200° F | 48.3 |
| 16 | 8 | | 39.3—G |

The following Table II shows runs for the conversion of isobutylene to methacrylonitrile, made with some of the above-described unpromoted catalysts, all the runs having been made under substantially similar process conditions as those described for preceding Table I.

TABLE II.—UNPROMOTED CATALYST

| Ex. No. | Atomic ratio arsenic: uranium | Calcined overnight at 900° F. and additionally for— | Percent per pass conversion isobutylene to methacrylonitrile |
|---|---|---|---|
| 17 | 0.7 | 3 hrs. at 1,500° F | 19.8 |
| 18 | 1 | 3.5 hrs. at 1,200° F | 39.7 |
| 19 | 2 | 3 hrs. at 1,700° F | 29.6 |
| 20 | 3 | 3 hrs. at 1,200° F | 42.8 |
| 21 | 5.8 | 3 hrs. at 1,375° F | 57.7 |

The following Table III shows runs, for the conversion of propylene to acrylonitrile, made with some of the above-described promoted catalysts, all the runs having been made under substantially similar process conditions as those described for preceding Table I. The promoted catalyst composition may be written $M_aU_xAs_yO_z$ where M denotes the promoter element and values for the symbols $a$, $x$ and $y$ are listed in the following Table III.

TABLE III

| Ex. No. | Promoter | Atomic ratios of components | | | Calcined overnight at 900° F. and additionally for— | Percent per pass conversion of propylene to acrylonitrile |
| | | a | x | y | | |
|---|---|---|---|---|---|---|
| 22 | Tungsten | 0.1 | 1 | 3 | 3 hours at 1,800° F | 48.2 |
| 23 | Zinc | 0.1 | 1 | 3 | do | 49.6 |
| 24 | Manganese | 0.1 | 1 | 3 | do | 52.1 |
| 25 | Iron | 0.1 | 1 | 3 | do | 53.4 |
| 26 | Chromium | 0.1 | 1 | 3 | do | 54.7 |
| 27 | Bismuth | 0.1 | 1 | 3 | do | 57.2 |
| 28 | Nickel | 0.1 | 1 | 3 | do | 59.7 |
| 29 | Tin | 0.1 | 1 | 3 | do | 60.1 |
| 30 | Vanadium | 0.1 | 1 | 3 | do | 61 |
| 31 | Boron | 0.1 | 1 | 3 | do | 61.1 |
| 32 | Molybdenum | 0.1 | 1 | 3 | do | 71.9 |

The following Table IV shows runs, for the conversion of isobutylene to methacrylonitrile, made with some of the above described promoted catalysts, all the runs having been made under substantially similar process conditions as those described for the preceding Table I. The promoted catalyst composition may be written $$M_aU_xAs_yO_z$$

where M denotes the promoter element and values for the symbols $a$, $x$ and $y$ are listed in the following Table IV.

TABLE IV

| Ex. No. | Promoter | Atomic ratios of components | | | Calcined overnight at 900° F. and additionally for— | Percent per pass conversion of propylene to acrolein |
| | | a | x | y | | |
|---|---|---|---|---|---|---|
| 33 | Molybdenum | 1 | 1 | 0.25 | 3 hrs. at 1,100° F | 56.1 |
| 34 | Antimony | 1 | 1 | 3 | 3 hrs. at 1,000° F | 9.4 |
| 35 | Vanadium | 0.1 | 1 | 3 | 3 hrs. at 1,000° F | 8.3 |

The following Table V shows runs, for the conversion of propylene to acrolein, made with some of the above-described unpromoted and promoted catalysts, all the runs having been made under substantially similar process conditions as those described for preceding Table I. The promoted catalyst composition $M_aU_xAs_yO_z$ where M denotes the promoter element and values for the symbols $a$, $x$ and $y$ are listed in the following Table V.

TABLE V

| Ex. No. | Promoter | Atomic ratios of components | | | Calcined overnight and additionally for— | Percent per pass conversion of propylene to acrolein |
| | | a | x | y | | |
|---|---|---|---|---|---|---|
| 36 | None | | 1 | 0.7 | 3 hrs. at 1,500° F | 9.0 |
| 37 | do | | 1 | 4.5 | 3 hrs. at 900° F | 12.8 |
| 38 | do | | 1 | 5.8 | 3 hrs. at 1,000° F | 14.9 |
| 39 | Molybdenum | 3 | 1 | 0.25 | 3 hrs. at 1,100° F | 50.2 |
| 40 | Iron | 0.1 | 1 | 3.0 | 3 hrs. at 1,000° F | 28.4 |
| 41 | Vanadium | 1 | 1 | 3.0 | 3 hrs. at 1,200° F | 37.9 |
| 42 | Bismuth | 1 | 1 | 3.0 | 3 hrs. at 1,000° F | 32.8 |

The following Table VI shows runs, for the conversion of isobutylene to methacrolein, made with some of the above-described unpromoted and promoted catalysts, all the runs having been made under substantially similar process conditions as those described for preceding Table I. The promoted catalyst composition may be written $M_aU_xAs_yO_z$ where M denotes the promoter element and values for the symbols $a$, $x$ and $y$ are listed in Table VI below.

TABLE VI

| Ex. No. | Promoter | Atomic ratios of components | | | Calcined overnight and additionally for— | Percent per pass conversion of isobutylene to methacrolein |
|---|---|---|---|---|---|---|
| | | $a$ | $x$ | $y$ | | |
| 43 | None | | 1 | 0.7 | 3 hrs. at 900 °F | 11.9 |
| 44 | do | | 1 | 4.5 | 3 hrs. at 1,000° F | 14.7 |
| 45 | do | | 1 | 5 | 3 hrs. at 1,200° F | 18.8 |
| 46 | Nickel | 1 | 1 | 3 | 3 hrs. at 1,000° F | 31.9 |
| 47 | Tin | 0.5 | 1 | 3 | 3 hrs. at 1,100° F | 29.8 |
| 48 | Molybdenum | 1 | 1 | 3 | | 39.8 |

The following Table VII shows runs, for the conversion of 1-butene to butadiene, made with some of the above-described promoted catalysts, all the runs having been made under substantially similar process conditions as those described under preceding Table I. The promoted catalyst composition may be written $M_aU_xAs_yO_z$ where M denotes the promoter element and values for the symbols $a$, $x$ and $y$ are listed in the Table VII below.

TABLE VII

| Ex. No. | Promoter | Atomic ratios of components | | | Calcined overnight and additionally for— | Percent per pass conversion to butadiene |
|---|---|---|---|---|---|---|
| | | $a$ | $x$ | $y$ | | |
| 49 | Antimony | 1 | 1 | 3 | 3 hours at 1,000° F | 29.2 |
| 50 | Vanadium | 0.1 | 1 | 3 | do | 38.5 |
| 51 | Iron | 0.1 | 1 | 3 | do | 32.3 |
| 52 | Molybdenum | 1 | 1 | 3 | do | 38.5 |
| 53 | do | 1 | 1 | 0.25 | 3 hrs. at 1,100° F | 18.2 |

We claim:

1. The process for the ammoxidation of propylene and isobutylene to form acrylonitrile and methacrylonitrile, respectively, which comprises contacting in the vapor phase at a temperature within the range from about 650° F. to about 1100° F. a mixture of ammonia, a molecular oxygen-containing gas and either propylene or isobutylene, or mixtures thereof, in a molar ratio of olefin to ammonia of from about 1:0.05 to about 1:5, and a molar ratio of oxygen to olefin within the range from about 0.5:1 to about 4:1, in the presence of a supported catalyst composition of the empirical formula $U_xAs_yO_z$ wherein $x$ is a number within the range from 1 to 25; $y$ is a number within the range from 1 to 10; and $z$ is a number taken to satisfy the oxidation state of the elements in said catalyst composition.

2. The process for the ammoxidation of propylene and isobutylene to form acrylonitrile and methacrylonitrile respectively which comprises contacting in a vapor phase at a temperature within the range from about 650° F. to about 1100° F. a mixture of ammonia, a molecular oxygen containing gas and either propylene or isobutylene, or mixtures thereof, in a molar ratio of olefin to ammonia or from about 1:0.05 to about 1:5 and a molar ratio of oxygen to olefin within the range from about 0.5:1 to about 4:1, in the presence of a supported catalyst composition of the empirical formula $M_aU_xAs_yO_z$ wherein $a$ is a number less than 1; $x$ is a number from about 1 to about 25; $y$ is a number from about 1 to about 6; and $z$ is a number taken to satisfy the oxidation state of the elements in the catalytic oxidation complex, where M is at least one element selected from the group consisting of molybdenum, boron, vanadium, tin, nickel, bismuth, chromium, iron, manganese, zinc, tungsten, and cerium.

References Cited

UNITED STATES PATENTS 3,328,315  6/1967  Callahan et al. _ 260—465.3 XR

JOSEPH P. BRUST, Primary Examiner

U.S. Cl. X.R.

252—432, 452, 456, 464, 465; 260—533, 604, 673, 673.5, 680